June 4, 1963     H. S. WOLFF ETAL     3,092,583
APPARATUS FOR MEASURING DUST PARTICLES
Filed March 30, 1959     2 Sheets-Sheet 1
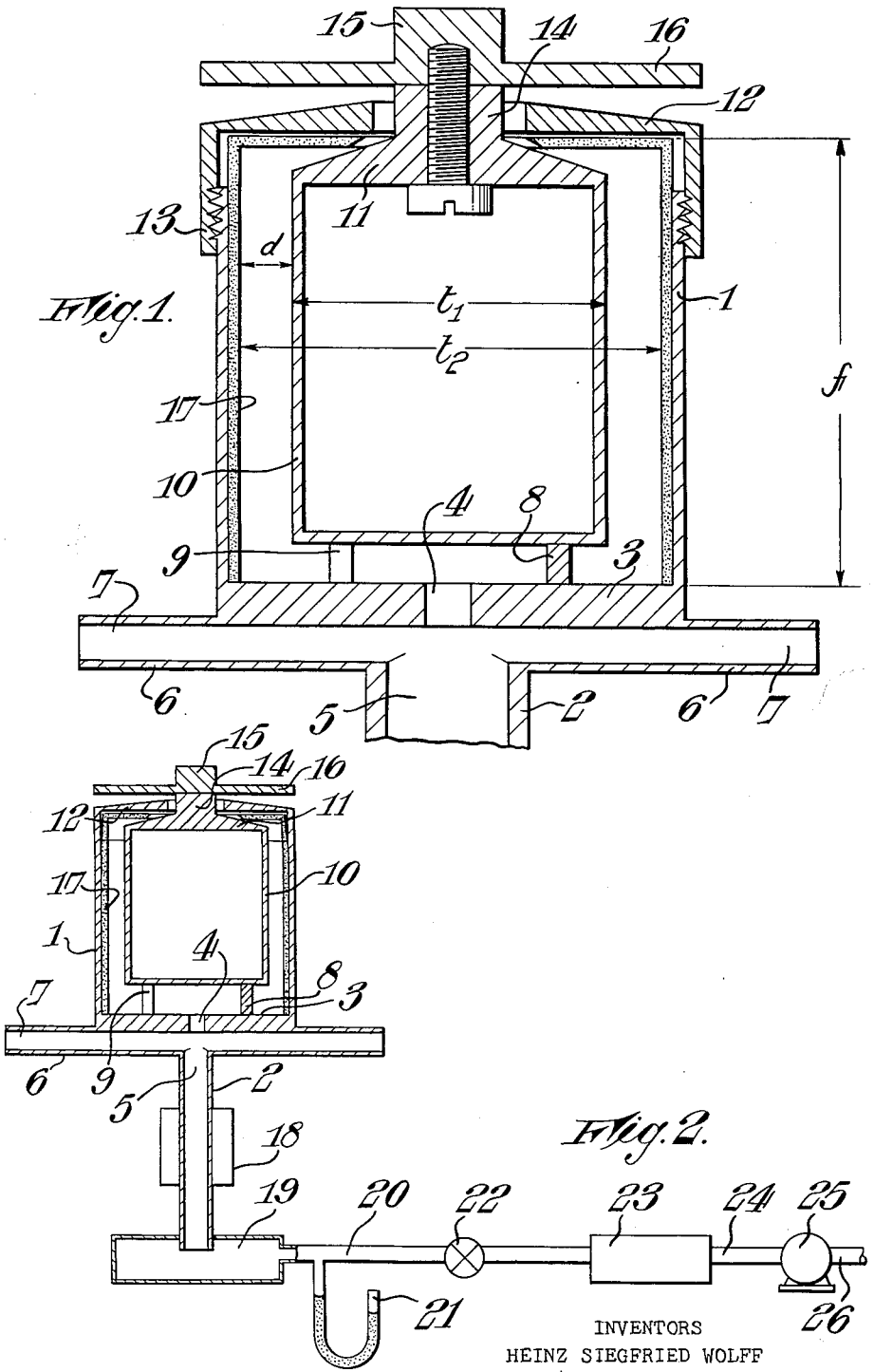
INVENTORS
HEINZ SIEGFRIED WOLFF
STANLEY ALEC ROACH

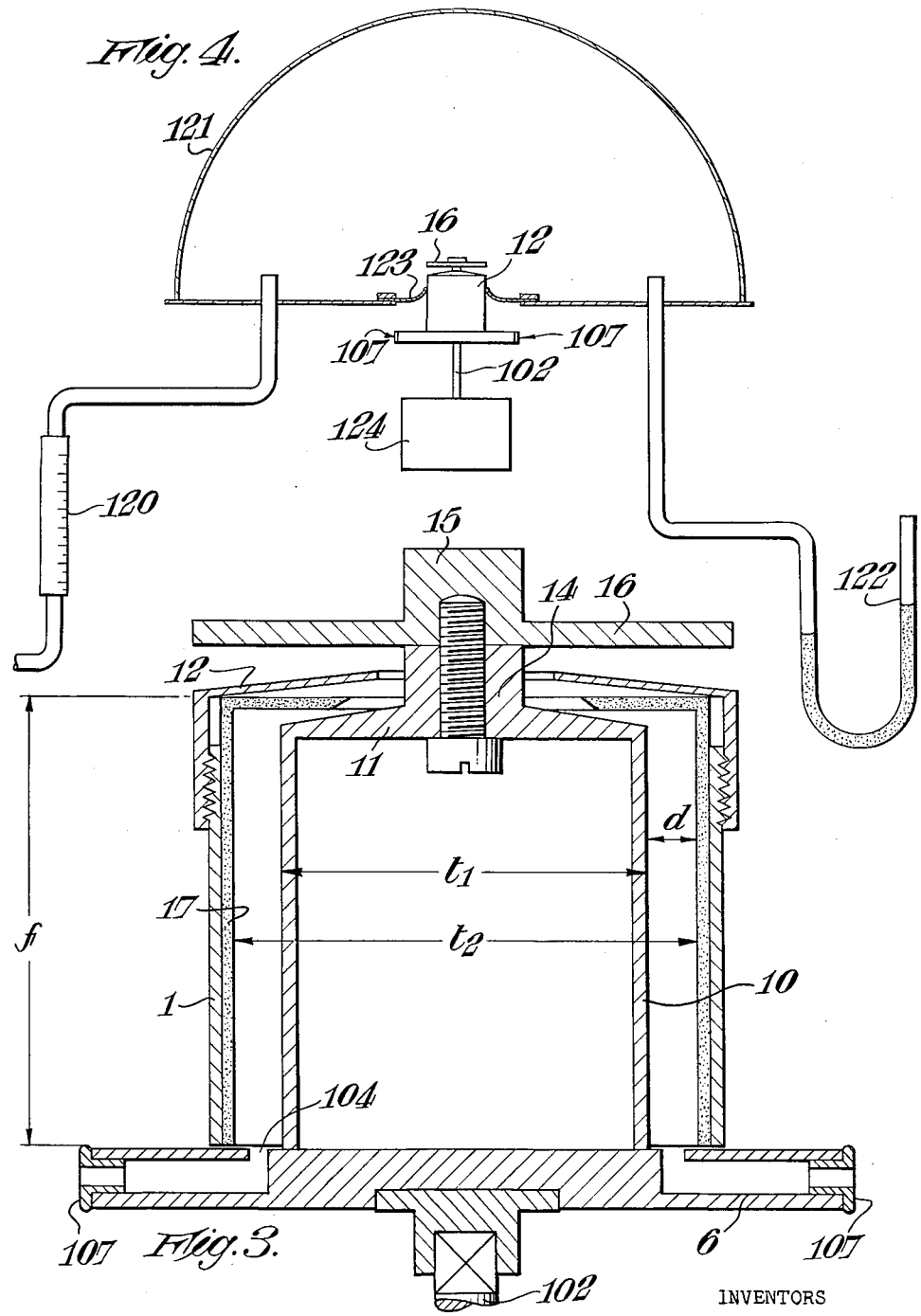

United States Patent Office 3,092,583
Patented June 4, 1963

3,092,583
APPARATUS FOR MEASURING DUST PARTICLES
Heinz Siegfried Wolff, % National Institute for Medical Research, Medical Research Council Laboratories, Holly Hill, Hampstead, London NW. 3, England, and Stanley Alec Roach, % Pneumoconiosis Research Unit, Medical Research Council, Llandough Hospital, near Penarth, Glamorgan, Wales
Filed Mar. 30, 1959, Ser. No. 802,780
Claims priority, application Great Britain Apr. 18, 1958
6 Claims. (Cl. 233—3)

This invention relates to apparatus for measuring the airborne concentration of dust particles and for separating particles of chosen size from an air supply.

Apparatus is known for measuring the concentration of dust particles in an atmosphere and also for measuring the particle size. In discussion of dust particles, it is usual to refer to dust particles in terms of the diameter of a spherical particle of a material of unit density, which spherical particle has the same terminal velocity in free fall through the atmosphere as has the particle referred to. It will be convenient to use this convention in the description which follows.

In considering problems relating to dust deposition in the respiratory system of human beings, only dust particles of size lying between certain limits enter into consideration. This results from the fact that when a dust-laden atmosphere is inhaled, only those dust particles deposited in the alveoli are retained permanently in the respiratory system. Large dust particles sediment out in the trachea, bronchi and bronchioles. These particles are subsequently swept towards the mouth again by the ciliated epithelium lining these passages. The mucus carrying the particles is then swallowed or spat out. Very small particles, on the other hand, sediment so slowly that they behave almost like a gas and are mostly carried out of the respiratory system again in the exhaled air.

The terminal velocity of dust particles, which is a measure of the rate of sedimentation, also governs the retention of the particles in the respiratory system or their rejection in one manner or another.

Accordingly, it is desired to measure the concentration in an atmosphere of dust particles of sizes lying between certain limits, and an object of the present invention is to provide apparatus by which this may be performed in a simple manner.

According to the present invention, apparatus for separating from an airstream dust particles of sizes lying between an upper limit and a lower limit comprises a centrifugal pump having an inlet port and an outlet port and between them a chamber in which dust particles can be deposited by centrifugal action, the throughput velocity of air being such that particles of size smaller than the lower limit are mostly carried through the pump and exhausted therefrom without being deposited in the chamber and the inlet port is so shaped and dimensioned that particles larger than the upper limit are centrifugally accelerated to a velocity exceeding the intake air velocity, so that such particles do not enter the pump.

Conveniently, an apparatus according to the present invention may be used to measure the concentration of dust particles of a specified size range in an atmosphere by passing a known volume of the atmosphere through the apparatus and weighing the particles retained in the apparatus.

The present invention also provides a method of calibrating such apparatus to determine the size of particles trapped therein and the volume of atmosphere passing therethrough.

By way of further explanation of the invention, two embodiments will now be described in detail by way of example, with reference to the accompanying drawings, of which:

FIGURE 1 is a diagrammatic drawing, not to scale, showing in axial section a centrifugal pump comprising a trap for dust particles of sizes lying between certain limits; and FIGURE 2 is a diagram showing the pump of FIGURE 1 together with ancillary apparatus used for the purpose of calibration;

FIGURE 3 is a diagrammatic drawing showing a modified form of apparatus to that shown in FIGURE 1; and FIGURE 4 is a diagram showing the pump of FIGURE 3 together with ancillary apparatus used for calibration.

The centrifugal pump of FIGURE 1 comprises a drum 1 mounted vertically on a hollow driving shaft 2. The drum 1 has a base 3 provided with a central, downwardly extending outlet aperture 4. The aperture 4 communicates with the central bore 5 of the hollow driving shaft 2 and also with the inner ends of a number of radial tubes 6 having central bores 7 which constitute the outlet ports of the pump.

A cylindrical member 8 having radial apertures 9 is mounted on the base 3 coaxially with the shaft 2 and carries a cylindrical member 10. The member 10 constitutes the central core of the pump and may be hollow, as shown in FIGURE 1, or solid as is convenient. Such member 10 has a conical tapered part 11 at the top. A conical cap 12 is screwed onto the top of the drum 1 by an internally threaded skirt 13. The conical part 11 of the core 10 has a cylindrical upper end 14 to which is secured a member 15 having a flange 16 of approximately the same diameter as the skirt 13.

The inlet port of the pump is the circular aperture between the flange 16 and the outer face of the conical cap 12. This aperture extends inwards radially and leads into the circular space between the inside surface of the cap 12 and the conical part 11.

Inside the drum 1 is arranged a removable cylinder 17 to which dust particles, deposited inside the drum 1 by centrifugal action, will stick.

The modification shown in FIGURE 3 is similar in its general mode of operation to the apparatus shown in FIGURE 1. In the modification of FIGURE 3, gas passing through the pump travels through an annular space 104 and leaves through jets 107 inserted in the ends of the tubes 6. The size of the jets 107 may be changed by fitting alternative jets. The pump of FIGURE 3 is driven by a solid shaft 102 in place of the hollow shaft 2 of FIGURE 1.

As indicated on the drawings, the outside diameter of the core 10 is $t_1$ and the inside diameter of the cylinder 17 is $t_2$, so that the distance $d$ between the cylinder 17 and the core 10 is $\frac{1}{2}(t_2 - t_1)$. The height of the cylinder 17 is $f$.

The rate of flow of dust laden air through the centrifugal pump is determined by the mechanical dimensions of the pump, the speed of rotation of the driving shaft 2, and the resistance to air flow offered by the shape of the pump. It is convenient to make the bores 7 large enough that the resistance to air flow offered by them is small and effective to control the rate of flow of air through the pump by the diameter of the aperture 4.

In the apparatus of FIGURE 3, the rate of flow is controlled by selecting a suitable size for the jets 107. The passage 104 is itself of sufficiently large diameter that it does not restrict the flow of air when jets 107 of smaller diameter are fitted.

The theory of operation of the pump is as follows:
Consider a dust particle carried by the air stream drawn into the inlet port of the pump. When the particle reaches a position between the flange 16 and the conical cap 12, it will be carried round by the air which will be rotated at the same speed as the pump. The particle will thus have the same angular velocity as the pump components.

The radial terminal velocity (V) of the particle due to the centrifugal force will be:

$$V = \frac{2}{9} \frac{a^2(b-z)w^2r}{4c}$$

where $a$ = diameter of particle
$b$ = density of particle
$z$ = density of air
$w$ = angular velocity of assembly = $2\pi \times$ revs/sec.
$r$ = radius of assembly
$c$ = viscosity of air The radial velocity of air entering at the inlet port of the pump is—

$$S = \frac{F}{2\pi r d}$$

where $F$ = flow rate of air in cc./sec.
$d$ = width of the annular passage in cms.

If $V > S$, the dust particle will not enter the pump but will be accelerated outwardly from the inlet port to a greater radial velocity than that of the inflowing air stream. If $V < S$, the dust particle will be accepted by the pump and will be drawn into the body of the pump.

The cap 12 is made cone-shaped to prevent sedimentation of particles on this surface due to gravity. A particle falling towards the surface of the cap experiences an outwards centrifugal force having a component away from the cap surface.

The accepted dust particle passes into the space between the core 10 and the removable cylinder 17. The particle experiences an outwardly directed centrifugal force tending to drive it onto the surface of the cylinder 17.

The largest particles accepted, having a high terminal velocity, will adhere to the cylinder 17 near the top. Smaller particles will adhere to the cylinder 17 lower down. Most of the smallest particles, which have the lowest terminal velocity, will not reach the cylinder 17 in the time of their passage through the central chamber, but will be carried out of the pump again in the exhausted air stream.

The smallest particle for which there will be 100% retention will have that terminal velocity which enables it to travel the distance $d$ in the time the air stream through the pump passes from the top of the cylinder 17 to the bottom, that is the distance $f$.

The mean acceleration on the particle will be given by the expression:

$$\frac{w^2(t_1+t_2)}{4}$$

The time T taken for the air stream to flow the distance $f$ is:

$$T = \frac{\pi(t_2^2 - t_1^2)f}{4F}$$

Therefore, for 100% retention of particles:

$$\frac{d}{\frac{2}{9}\frac{a^2(b-z)w^2(t_1+t_2)}{4c4}} \leq T$$

that is, the diameter $a_1$ of the smallest particle which will be retained 100% is:

$$a_1 = \sqrt{\frac{72dc}{T(b-z)w^2(t_1+t_2)}}$$

The fraction of particles of diameter $a$ smaller than $a_1$ retained will be equal to $a^2$. The remainder of the particles will be blown out of the tube 6.

It will be recognised, therefore, that the property of the pump in retaining dust particles between certain limits of size depends upon the dimensions of the device and the speed of rotation of the driving shaft to which the device is attached. It is preferred to rotate the driving shaft by a constant speed motor, either a synchronous motor driven from an alternating current source of constant frequency or a direct current motor provided with an assurance speed regulator. Alternatively, a speed-controlled air-driven motor can be used.

One practical embodiment, of the form shown in FIGURE 1, was made with the following dimensions:

| | Cm. |
|---|---|
| Height ($f$) | 5.7 |
| Diameter ($t_2$) | 4.0 |
| Length of tubes 6 | 1.5 |

This pump was rotated at a speed which gave a throughput flow rate of 2 litres per minute. According to calculations made, this pump was expected to reject particles of diameter above $7\mu$ and to provide 100% collection of particles entering the inlet port between $7\mu$ and $1.5\mu$.

An alternative pump, of the form shown in FIGURE 3, had the following dimensions:

| | |
|---|---|
| Overall height | 5.7 cms. |
| Overall diameter | 4.0 cms. |
| Diameter of pump disc | 8.4 cms. |
| Flow rate | 10 litres/minute at 8,000 r.p.m. |

The gap was adjusted to reject particles larger than $5\mu$ in diameter and the centrifugal collector collected 100% of all particles above $1\mu$ in diameter.

Experiment with artificial dust clouds containing spherical wax particles of known density and a range of diameters, provided practical results in agreement with the above calculated results, except in that the effective radius of the inlet port is somewhat smaller than the physical radius due, presumably, to the air in the gap rotating at a slightly lower speed than the rotating pump surfaces.

Methods of calibrating the pump will now be described with reference to FIGURE 2, in which figure the parts of the pump shown in FIGURE 1 are indicated by the same reference numbers and by reference to FIGURE 4, in which figure the same reference numbers are used as in FIGURE 3.

In FIGURE 2, the driving shaft 2 is constituted by the hollow rotor shaft of a constant-speed motor 18, the shaft 2 extending right through the motor body and terminating in a rotary gland box 19. The outlet of the gland box 19 is provided by a flow pipe 20, having a manometer tube 21 connected thereto and leading by way of a cock 22 to a flowmeter indicated at 23. The other side of the flowmeter 23 is connected by a pipe 24 to a variable negative pressure suction pump 25 having an exhaust pipe 26.

The basis of the method of calibration to be described is that the flow through the pump is directly related to the pressure at the downstream side of aperture 4.

Air can be drawn through the system shown in FIGURE 2 at a variable and measurable rate by means of the suction pump 25. The rate of flow is indicated by the flowmeter 23.

The following operations are then carried out:

First, the pump shown in FIGURE 1 is detached from the end of the hollow shaft 2. The relationship of pressure in the gland box 19, as indicated by the manometer 21, against the rate of air flow through the bore 5 is determined for a range of pressure with the motor rotating at standard speed.

Second, the pump is replaced on the shaft 2 and the bores 7 of the tubes 6 are blocked. The pump is then rotated by the motor 18 at the required speed. Again, by varying the suction from the suction pump 25, the rate of air flow through the system is determined for a range of pressures. The difference between the pressure determined by the above two operations for the same rate of air flow gives the pressure at the aperture 4 for that particular rate of flow. By a succession of such computations the relationship between the pressure at the aperture 4 and the rate of air flow is determined for a range of values and may conveniently be expressed as a graph.

Third, the bores 7 are unblocked and the pump is again rotated at the speed used in the second operation. The cock 22 is closed. Since there is now no air flow through the system, the pressure indicated by the manometer 21 is the same as the pressure at the aperture 4. By reference to the graph prepared by the said computations, the corresponding rate of air flow through the pump can be ascertained.

The method of calibration illustrated in FIGURE 4 is applicable to the apparatus shown in FIGURE 3.

The inlet port of the pump apparatus shown in FIGURE 3 is fitted into an impermeable enclosure 121 and connected thereto by a rotatable substantially airtight seal 123. The pump is driven by a motor 124 and the shaft 102. Conveniently, the seal 123 is formed between a finned aluminium ring carried by the rotor and a thin sheet of poly-tetra-fluor-ethylene which has a hole punched in it slightly smaller than the ring so that it forms a bell-mouthed seal when the ring is pushed up through it.

Air is fed from a blower, not shown, through a flowmeter 120 and into the enclosure 121. Leading from the enclosure is a pipe provided with a sensitive manometer 122.

The pump is rotated by the motor 124 at a selected speed and air blown into the enclosure at such a rate that the manometer 122 registers no pressure difference between that in the enclosure 121 and atmospheric pressure. This indicates that the air input, as registered on the flowmeter 120, is equal to the amount of air passing through the pump driven by the motor 124.

In operation, the pump is operated for a known period of time. After operation the cylinder 17 of known weight is removed from inside the pump body and the quantity of dust adhering thereto is weighed by difference. From the known rate of air flow through the pump and the known period of operation, the total volume of air passed can be found. The weight of dust particles having sizes between the determined limits present in the volume of air examined is thus known. If the mean density of the dust particles and size distribution is known, the number of particles present can be calculated from the weight figure.

The pumps provided by the invention may conveniently be incorporated into face masks to ensure that dust particles of specified size range are trapped and do not enter the lungs of the wearer of the mask. In addition a mask incorporating a pump according to this invention will offer no resistance to inspiration and will, in fact, produce a small positive pressure.

We claim:

1. Apparatus for separating dust particles of size between predetermined upper and lower limits from an air stream comprising coaxially disposed drum and core members mounted for rotation about their axes, said drum member having inlet and outlet openings in its ends, said inlet opening being coaxial with the drum, a disc-shaped member disposed outside the drum adjacent to the inlet end wall thereof, a portion of said core extending through said inlet opening in said drum end wall to define therewith an annular inlet for the drum and extending into the drum in spaced relation to the drum side wall to define therewith an annular passage extending from said annular inlet toward the other end of the drum, said disc-shaped member being coaxial with the inlet opening and having its adjacent end face extending substantially perpendicular to the drum axis in spaced relation with said drum end wall to define an annular clearance therewith communicating with said annular inlet, said clearance having such an axial width that rotation of the members at a predetermined speed causes air passing therethrough to rotate before entering the inlet thereby discharging particles of size larger than said upper limit, and means for inducing a flow of air into said inlet opening.

2. Apparatus according to claim 1 wherein said drum end wall and the adjacent end face of the disc-shaped member are of substantially equal diameter.

3. Apparatus according to claim 2 wherein said annular passage has such a radial width that rotation of the members at said predetermined speed causes air passing therethrough to rotate thereby discharging particles of size between said predetermined upper and lower limits on said drum side wall.

4. Apparatus according to claim 3 further comprising a removable liner disposed in said passage about the inner periphery of said drum side wall.

5. In apparatus for separating dust particles of sizes between predetermined upper and lower limits from a fluid stream, coaxially disposed drum and core members, at least said drum member being mounted for rotation about the axis, said drum member having a coaxial inlet opening in one of its end walls and an outlet located toward the other end of the drum, a substantially disc-shaped member adjacent the outer end wall of the drum above and coaxial with the inlet opening and arranged for rotation with the drum, the adjacent end face of said disc-shaped member extending substantially perpendicular to the drum axis, said disc-shaped member and said outer end wall defining a substantially annular clearance leading into the drum inlet, the clearance being sufficient to rotate the fluid passing into the inlet and to thereby discharge particles of size larger than the desired upper limit, said inlet opening and said outlet opening communicating with the annular passage formed between said core and said drum.

6. Apparatus according to claim 5 further comprising means for inducing air flow from said inlet to said outlet.

References Cited in the file of this patent

UNITED STATES PATENTS

| | | |
|---|---|---|
| 631,680 | Staahlgren | Aug. 22, 1899 |
| 1,061,656 | Black | May 13, 1913 |
| 2,186,836 | McGlaughlin | Jan. 9, 1940 |
| 2,258,155 | Watson | Oct. 7, 1941 |
| 2,587,206 | Pattinson | Feb. 26, 1952 |